United States Patent [19]
Yoshida et al.

[11] Patent Number: 5,976,049
[45] Date of Patent: Nov. 2, 1999

[54] SUPPORTING WALL STRUCTURE OF TOROIDAL TYPE INFINITELY VARIABLE AUTOMATIC TRANSMISSION

[75] Inventors: Takeo Yoshida, Fuji; Masaki Nakano, Yokohama; Haruhito Mori, Kawasaki, all of Japan

[73] Assignees: Jatco Corporation, Fuji; Nissan Motor Co., Ltd., Yokohama, both of Japan

[21] Appl. No.: 09/065,412

[22] Filed: Apr. 24, 1998

[30] Foreign Application Priority Data

Apr. 30, 1997 [JP] Japan .................................... 9-113021

[51] Int. Cl.⁶ ............................ F16H 15/48; F16H 57/02
[52] U.S. Cl. .......................... 475/185; 74/606 R; 476/40; 475/216
[58] Field of Search .................................... 475/216, 192, 475/214, 185; 74/606 R; 476/40, 42

[56] References Cited

U.S. PATENT DOCUMENTS

| | | | |
|---|---|---|---|
| 5,248,285 | 9/1993 | Nakano | 476/40 |
| 5,254,056 | 10/1993 | Nakano | 476/10 |
| 5,269,201 | 12/1993 | Uematsu | 74/606 R |
| 5,483,850 | 1/1996 | Yamauchi | 74/606 R |
| 5,495,778 | 3/1996 | Mochizuki | 74/606 R |

FOREIGN PATENT DOCUMENTS 2 313 424  11/1997  United Kingdom .

OTHER PUBLICATIONS

"A Primer of Automatic Transmission", published by Guranpuri, Ltd. (1995), p. 199.

Primary Examiner—Charles A Marmor
Assistant Examiner—Tisha D. Waddell
Attorney, Agent, or Firm—Foley & Lardner

[57] ABSTRACT

In a toroidal type infinitely variable automatic transmission comprising an oil pump mounted on a transmission case, first and second toroidal transmission mechanisms disposed within the case and having input and output disks for transmitting a rotational force through a tiltable friction roller, a forward and backward change-over mechanism positioned between the transmission mechanism and the oil pump and disposed within the case, for changing over between forward and backward operations of the transmission mechanism through a planetary gear mechanism by manipulation of forward and backward clutches, and a supporting wall positioned between the forward and backward change-over mechanism and the transmission mechanism and disposed within the case, for receiving a thrust force exerted towards a transmission mechanism side by the planetary gear mechanism, an extension member is provided on a side portion of the oil pump to extend within the case towards a transmission mechanism side, and the supporting wall is mounted on the extension member at a position opposing to a carrier plate of the planetary gear mechanism.

7 Claims, 2 Drawing Sheets

SUPPORTING WALL STRUCTURE OF TOROIDAL TYPE INFINITELY VARIABLE AUTOMATIC TRANSMISSION

BACKGROUND OF THE INVENTION

1. Field of the Invention

The present invention relates to a supporting wall structure for receiving a thrust force of a planetary gear mechanism constituting a forward and backward change-over mechanism in a toroidal type infinitely variable automatic transmission.

2. Description of the Prior Art

In a toroidal type infinitely variable automatic transmission, because a toroidal transmission mechanism is moved in the axial direction and still the control of the axial force of the toroidal transmission mechanism is difficult, it is necessary to prevent the axial thrust force generated in a forward and backward change-over mechanism adjacent to the toroidal transmission mechanism from being transmitted to the toroidal transmission mechanism.

A supporting wall for receiving this thrust force is provided between the forward and backward change-over mechanism and the toroidal transmission mechanism. Such a supporting wall structure in the prior art is known in which, for example, a supporting wall member is mounted on an inner peripheral wall of a transmission case (see, "A Primer of Automatic Transmission", on page 199, FIG. 8–20, published by GURANPURI, Ltd., on Jun. 5, 1995).

In assembling such a prior art toroidal type definitely variable automatic transmission, after placing a toroidal transmission mechanism and then, the supporting wall member within a transmission case, constituting parts of a forward and backward change-over mechanism and parts of an oil pump and the like are assembled one by one in a main line. So there is a drawback that the line assembly efficiency is degraded due to lack of subassembling.

SUMMARY OF THE INVENTION

The present invention was made in order to obviate such a drawback, and it is an object to provide a supporting wall structure of a toroidal type infinitely variable automatic transmission which enables to assemble a subassembly so as to improve the line assembly efficiency and to reduce the production cost.

In order to achieve the object, in a first aspect of the invention, in a toroidal type infinitely variable automatic transmission comprising an oil pump mounted on a transmission case, a toroidal transmission mechanism disposed within the transmission case and having an input disk and an output disk for transmitting a rotational force through a tiltable friction roller, a forward and backward change-over mechanism positioned between the toroidal transmission mechanism and the oil pump and disposed within the transmission case, for changing over between forward and backward operations of the toroidal transmission mechanism through a planetary gear mechanism by manipulation of forward coupling means and backward coupling means, and a supporting wall positioned between the forward and backward change-over mechanism and the toroidal transmission mechanism and disposed within the transmission case, for receiving a thrust force exerted towards a toroidal transmission mechanism side from the planetary gear mechanism, a supporting wall structure comprises an extension member provided on a side portion of the oil pump to extend along an inner peripheral surface of the transmission case towards a toroidal transmission mechanism side, said supporting wall being mounted on the extension member at a position opposing to a carrier of the planetary gear mechanism.

In a second aspect of the invention, the extension member is formed in a drum shape, and the forward coupling means or the backward coupling means is supported by the drum shaped extension member.

In a third aspect of the invention, in the first aspect or the second aspect of the invention, a cylinder chamber is provided at a radially inner position of the extension member so that the cylinder chamber opens at the side portion of the oil pump along a circumferential direction, and a piston for engaging or disengaging the forward coupling means or the backward coupling means is accommodated in the cylinder chamber.

In a fourth aspect of the invention, in any one of the first to third aspects of the invention, a sun gear of the planetary gear mechanism is axially supported on a side of the carrier opposite to the supporting wall.

DESCRIPTION OF THE PREFERRED EMBODIMENT

Figure 1:
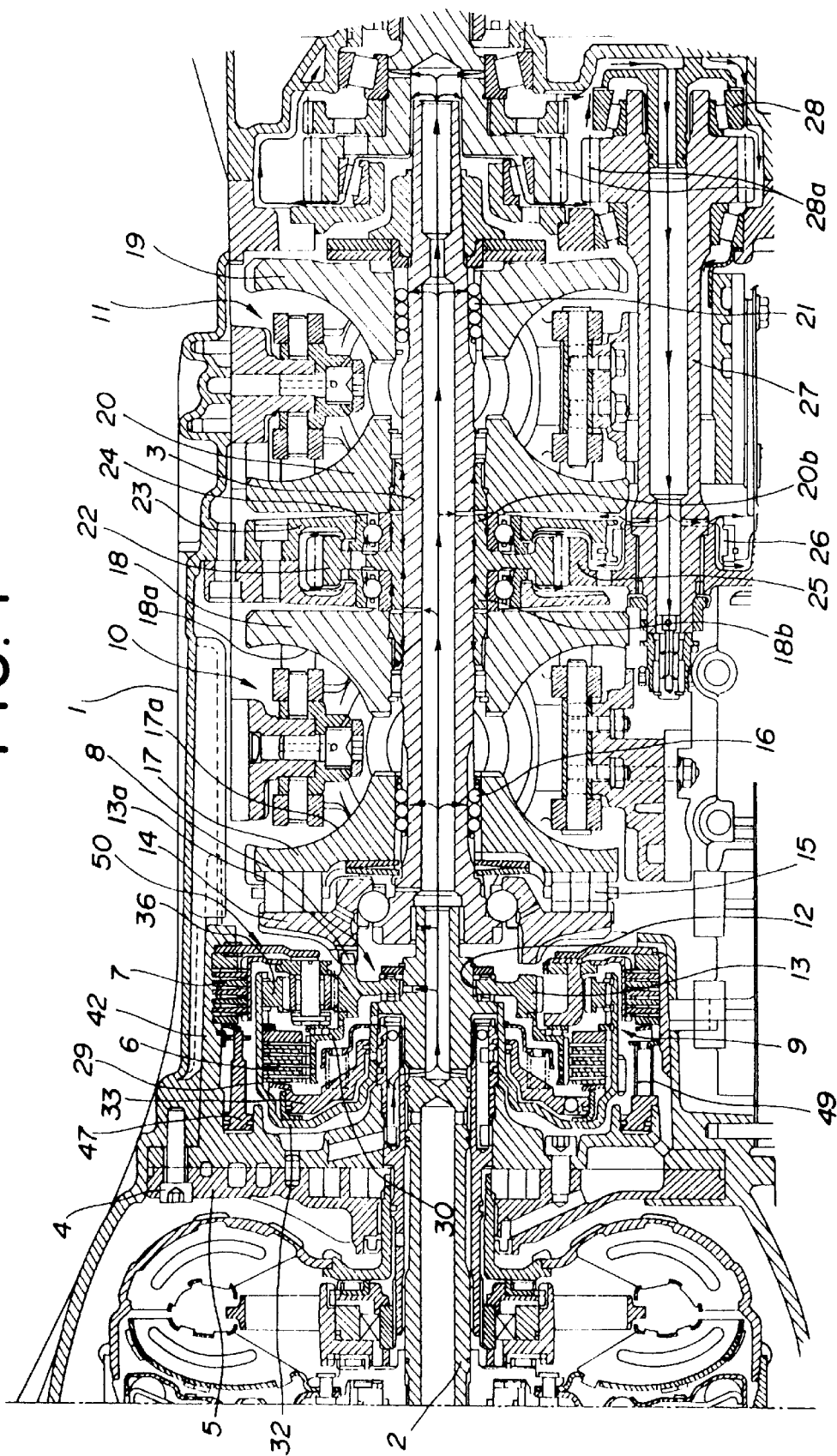
FIG. 1 is a sectional view of a toroidal type infinitely variable automatic transmission which is one example of an embodiment of the invention useful to explain a supporting wall structure.

As shown in FIG. 1, an input shaft 2 connected to a rotary driving source (not shown), and a rotary shaft 3 concentrically connected to the input shaft 2 at a right side thereof are disposed within a transmission case 1, and at the input shaft 2 side, there are provided with an oil pump 5 mounted on an end portion of the transmission case 1 with a bolt 4, and a forward and backward change-over mechanism 9 disposed adjacent to the oil pump 5 at a right side thereof. The forward and backward change-over mechanism 9 performs change-over between a forward drive operation and a backward drive operation of a first and a second toroidal transmission mechanism 10, 11 through a planetary gear mechanism 8 by manipulation of a forward clutch (forward coupling means) 6 and a backward brake (backward coupling means) 7. Furthermore, at the output shaft 3 side, there are provided with the first and the second toroidal transmission mechanism 10, 11 spaced from each other in the axial direction.

Between the input shaft 2 and the rotary shaft 3, there are interposed with a sun gear 13 rotatably supported by the input shaft 2 through a needle bearing 12 and constituting an element of the planetary gear mechanism 8 of the forward and backward change-over mechanism 9, a loading cam 14 engaged with a claw portion 13a formed on the sun gear 13 and rotatably supported by the rotary shaft 3, and an input disk 17 connected to the loading cam 14 through an engaging roller 15 and supported by the rotary shaft 3 through a ball spline 16. The rotational force from the input shaft 2 is sequentially transmitted to the claw portion 13a of the sun gear 13 through the forward and backward change-over mechanism 9 and to the loading cam 14, and eventually to the rotary shaft 3 through the engaging roller 15, the input disk 17, and the ball spline 16.

Wave-shaped cam surfaces are respectively formed on mutually opposing surfaces of the loading cam 14 and the input disk 17 to allow the engaging roller 15 to engage both or them. By generating the thrust proportional to a torque due to a lead on the cam surfaces by the engaging roller 15, it is made possible to adjust the thrust (moving force) proportional to an output torque of a torque converter, and to apply the thrust to the first and the second toroidal transmission mechanism 10, 11.

For the sake of convenience of explanation, first, the first and the second toroidal transmission mechanism 10, 11 will be explained. The first toroidal transmission mechanism 10 includes the input disk 17 having a toroidal surface 17a formed on a surface remote from the engaging roller 15, an output disk 18 having a toroidal surface 18a formed on a surface opposing to the input disk 17 and rotatably supported by the rotary shaft 3, and a friction roller (not shown) disposed in a toroidal-shaped groove defined by the toroidal surfaces 17a and 18a of the input and output disks 17 and 18 so that the friction roller is tiltably in contact with both the disks. The friction roller is tiltably supported by a roller supporting mechanism (not shown), and the rotational speed ratio between the input disk 17 and the output disk 18, that is, the transmission gear ratio can be continuously varied by changing radial contact positions of the friction roller with respect to the input and output disks 17 and 18 by manipulating a driving mechanism (not shown).

The second toroidal transmission mechanism 11, similar to the first toroidal transmission mechanism 10, includes an input disk 19, an output disk 20, a friction roller, a roller supporting mechanism, and a driving mechanism. The input disk 19, which is outer fitted onto the rotary shaft 3 through a ball spline 21, is disposed at a position remote from the first toroidal transmission mechanism 10, and at the same time, the output disk 20 is disposed at a near side of the first toroidal transmission mechanism 10.

Cylindrical shaft portions 18b and 20b are provided at the rear of the output disks 18 and 20, respectively, which are opposing to each other, and an output gear 22 is spline coupled with the cylindrical shaft portions 18b and 20b. The output gear 22 is supported through a bearing 24 by a gear housing 23 which is secured to an inner peripheral wall of the transmission case 1. The output gear 22 is engaged with a counter gear 25, and this counter gear 25 is rotatably supported by the gear housing 23 through a bearing 26. A counter shaft 27 passing through a center portion of the counter gear 25 has one end spline coupled with the counter gear 25 to rotate therewith as a unit, and the other end of the counter shaft 27 is rotatably supported by the transmission case 1 through a bearing 28. Here, the output having a predetermined transmission gear ratio by the tilting manipulation of the friction roller as mentioned above, is transmitted to the output gear 22, and sequentially transmitted to an output shaft (not shown) through the counter gear 25, the counter shaft 27, and a gear train 28a. The change over between the forward and backward drive operation of the output shaft is achieved by performing the change over between the forward and backward drive operation with respect to the first and second toroidal transmission mechanism 10, 11 by the forward and backward change over mechanism 9.

Figure 2:
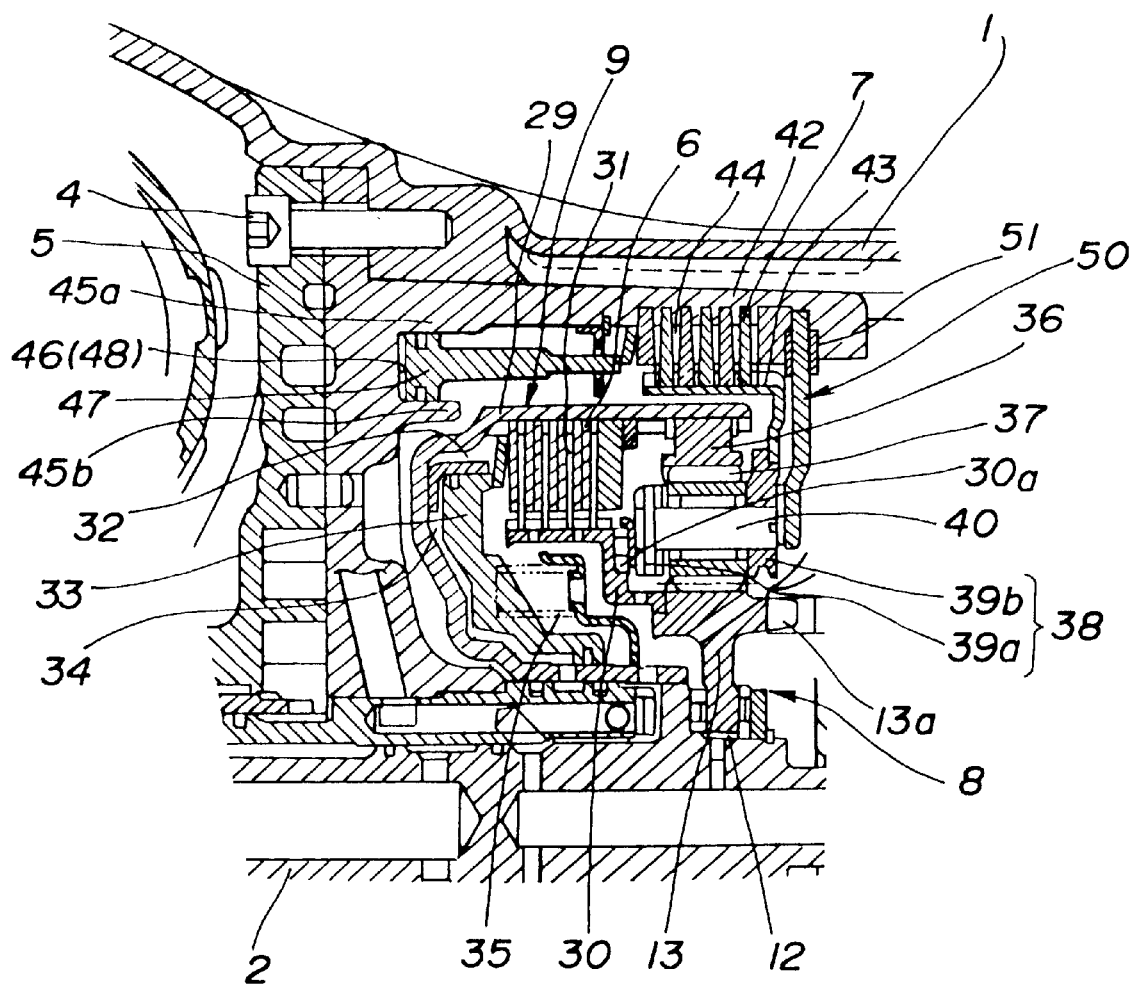
FIG. 2 is a partially enlarged view of FIG. 1.

With reference to FIG. 2, the forward and backward change over mechanism 9 is constituted by a forward clutch 6, a backward brake 7, and the planetary gear mechanism 8.

The forward clutch 6 is positioned between the oil pump 5 and the planetary gear mechanism 8, and is provided with a clutch drum 29 which is outer fitted onto the input shaft 2. The clutch drum 29 rotates with the input shaft 2 as a unit, and a clutch hub 30 supported by the sun gear 13 of the planetary gear mechanism 8 is disposed at a radially inner position of the clutch drum 29. The clutch drum 29 and the clutch hub 30 support clutch disks 31 arranged alternately. Here, the clutch hub 30 is axially supported by a carrier 38 described later at an opposite side to the supporting wall 50 through a bearing 30a, and thus, the sun gear 13 of the planetary gear mechanism 8 is supported axially by the carrier 38 at an opposite side to the supporting wall 50 through the clutch hub 30.

A cylinder chamber 32 is formed within a base end portion (end portion at the oil pump 5 side) of the clutch drum 29, and a piston 33 is accommodated in the cylinder chamber 32. A hydraulic pressure chamber 34 is formed between the piston 33 and the cylinder chamber 32, and the clutch disks 31 are pressed, or the pressing is released, by controlling the supply of hydraulic oil to the hydraulic pressure chamber 34, thereby performing the engagement or disengagement of the forward clutch 6. In the figure, the reference numeral 35 designates a return spring for returning the piston 33 to its original position when the pressing of the clutch disks 31 is released.

Furthermore, a ring gear 36 is mounted on an inner peripheral portion of an end of the clutch drum 29, and the ring gear 36 is engaged with the sun gear 13 through a pinion 37. The pinion 37 is rotatably supported by a pinion shaft 40 whose opposite ends are fixed to carrier plates 39a and 39b of the carrier 38 opposing to each other.

The backward brake 7 includes a drum 42 disposed at a radially outer position of the clutch drum 29. The drum 42 is constituted by an extension member having a drum shape and extending from a right side portion of the oil pump 5 towards the first toroidal transmission mechanism 10, and the drum 42 is integral with the side portion of the oil pump 5. A brake hub 43 is disposed between the drum 42 and the clutch drum 29 of the forward clutch 6, and the brake hub 43 is supported by the carrier plate 39b at a first toroidal transmission mechanism 10 side. The drum 42 and the brake hub 43 support brake disks 44 alternately arranged.

Two peripheral wall portions 45a and 45b extending along a whole circumference in a circumferential direction are formed radially spaced from each other at a right side of the oil pump 5 at positions radially inward of the drum 42, and a cylinder chamber 46 is formed between the peripheral wall portions 45a and 45b. A piston 47 is accommodated in the cylinder chamber 46, and a hydraulic pressure chamber 48 is formed between the piston 47 and the cylinder chamber 46. The brake disks 44 are pressed or released from the pressing by controlling the supply of hydraulic oil to the hydraulic pressure chamber 48 thereby performing engagement and disengagement of the backward brake 7. In FIG. 1, the reference numeral 49 designates a return spring for returning the piston 47 to its original position when the pressing of the brake disks 44 is released.

At the time of forward drive operation, the forward clutch 6 is pressed by the piston 33 to make the forward clutch 6 enter an engagement condition, and the backward brake 7 is released from the pressing by the piston 47 to make the backward brake 7 enter a disengagement condition. Under such a condition, the input shaft 2, the clutch drum 29, the ring gear 36, the carrier 38, and the sun gear 13 are rotated in the same direction as a unit. Consequently, the rotational force is transmitted to the first toroidal transmission mechanism 10 through the loading cam 14 which is engaged with the claw portion 13a of the sun gear 13.

On the other hand, at the time of backward drive operation, the clutch disks 31 of the forward clutch 6 are released from the pressing by the piston 33 to make the forward clutch 6 enter a disengagement condition, and the brake disks 44 of the backward brake 7 are pressed by the piston 47 to make the backward brake 7 enter the engagement condition. Consequently, the revolution of the pinion 37 is interrupted through the clutch hub 43 and the carrier 38. Under such a condition, the rotational force from the input shaft 2 and the clutch drum 29 which are integral with each other is transmitted from the ring gear 36 to the sun gear 13 through the pinion 37, however, since the revolution of the pinion 38 is interrupted as described above, the sun gear 13 is rotated in an opposite direction with respect to the input shaft 2, and the rotational force is transmitted to the first toroidal transmission mechanism 10 through the loading cam 14 which is engaged with the claw portion 13a of the sun gear 13.

Here, in the toroidal infinitely variable automatic transmission, as described above, by generating the thrust proportional to the torque by the lead of the cam surface by the engagement roller 15, it is made possible to adjust the thrust (moving force) proportional to the output torque of the torque converter and to apply the thrust to the first and second toroidal transmission mechanism 10, 11. In order to keep this thrust severely controlled, it is necessary to prevent the thrust force in the axial direction generated by the forward and backward change-over mechanism 9 adjacent to the first and the second toroidal transmission mechanism 10, 11 from being transmitted to the first and the second toroidal transmission mechanism 10, 11.

Accordingly, in this embodiment, a supporting wall 50 for receiving the above-mentioned thrust force is provided between the forward and backward change-over mechanism 9 and the first and the second toroidal transmission mechanism 10, 11 in the following manner.

Specifically, the supporting wall 50 is formed in a doughnut plate shape, and the supporting wall 50 is mounted on an inner peripheral wall of the drum 42 extending from a right side portion of the oil pump 5 towards the first toroidal transmission mechanism 10 so that an outer peripheral portion of the supporting wall 50 is fixed through a snap spring 51 to the inner peripheral wall of the drum 42 at a position between the backward brake 7 and a tree end of the drum 42. At this position of the supporting wall 50, an inner peripheral portion thereof is opposing to the carrier plate 39a of the carrier 38 at the first toroidal transmission mechanism 10 side. By virtue of this, the thrust force from the carrier 38 generated by the forward and backward change-over mechanism 9 side is received by the supporting wall 50, and the thrust force is not transmitted to the first and second toroidal transmission mechanism 10, 11.

As will be apparent from the above description, in the supporting wall structure of such a toroidal type infinitely variable automatic transmission, the supporting wall 50 is mounted on the inner peripheral wall of the extension member extending from the right side portion of the oil pump 5, and at the same time, the extension member is constituted by the drum 42 of the backward brake 7. Moreover, the cylinder chamber 46 is formed at the side portion of the oil pump 5, and the piston 47 for performing the engagement and the disengagement of the backward brake 7 is accommodated in the cylinder chamber 46. Furthermore, the sun gear 13 of the planetary gear mechanism 8 is axially supported by the carrier 38 through the clutch hub 30 at the opposite side of the supporting wall 50, and further, the forward clutch 6 and the planetary gear mechanism 8 are accommodated in the drum 42 of the backward brake 7, and since the supporting wall 50 serves as a cover to prevent the above-mentioned members from being separated from one another, it is possible to form one assembly by packaging the oil pump 5, the backward brake 7, the forward clutch 6, and the planetary gear mechanism 8 (including the sun gear 13).

As a result, in the assembling work, the oil pump 5, the forward clutch 6 and backward brake 7, and the planetary gear mechanism 8 are assembled in a subassembly beforehand in a subline to form a package, and after the first and the second toroidal transmission mechanism 10, 11 are placed in the transmission case 1, it is only necessary to assemble the oil pump 5, the forward clutch 6 and backward brake 7, and the planetary gear mechanism 8 which have been formed as one assembly in the main line. Thus, the line assembly efficiency is improved and the production cost can be reduced.

In the above embodiment, the backward coupling means is supported by the extension member, and the piston for performing the engagement and disengagement of the backward coupling means is accommodated in the extension member, however, the above-mentioned backward coupling means may be replaced by the forward coupling means. In this case, as compared with the above embodiment, a change will be necessary to increase the number of gears at the downstream side of the toroidal transmission mechanism by one stage, or to change the combination of the planetary gear mechanism.

Furthermore, in the above embodiment, the present invention is applied to the halt-toroidal type infinitely variable automatic transmission, however, it is of course possible to apply the present invention to the full-toroidal type infinitely variable automatic transmission.

Moreover, in the above embodiment, the extension member or the drum shape is employed, however, an extension member of a beam shape may be used instead.

The present invention otters the following advantage.

As will be seen from the description in the foregoing, according to the first aspect of the invention, in the assembling work, after the toroidal transmission mechanism is placed into the transmission case, it is only necessary to assemble in a main line as one assembly the oil pump, the forward and backward coupling means, and the planetary gear mechanism which have been formed as a package (a subassembly) beforehand. Thus, the line assembly efficiency is improved and the production cost can be reduced.

According to the second aspect of the invention, in addition to the first aspect, by forming the extension member in a drum shape and by supporting the forward coupling means or the backward coupling means by the drum, it is possible to omit the assembling work of the drum, and consequently, the labor hours for the whole assembling work can be reduced.

According to the third aspect of the invention, in addition to the first or second aspect, the cylinder chamber is formed at the side portion of the oil pump, and the piston for performing the engagement and disengagement of the forward coupling means or the backward coupling means is accommodated in the cylinder chamber. Thus, it is possible to eliminate the assembling work of the piston, and consequently, the labor hours for the whole assembling work can be reduced.

According to the fourth aspect of the invention, in addition to any one of the first to third aspects, it is possible to form a package of the constituent members including as tar as the sun gear of the planetary gear mechanism.

We claim:

1. A toroidal infinitely variable automatic transmission comprising:

a transmission case;

an oil pump mounted on the transmission case;

a toroidal transmission mechanism disposed within the transmission case and having an input disk, an output disk, and a tiltable friction roller, the output disk transmitting a rotational force through the tiltable friction roller;

a forward and backward change-over mechanism, including a forward coupling element, a backward coupling element, and a planetary gear mechanism having a carrier, positioned between the toroidal transmission mechanism and the oil pump and disposed within the transmission case, the forward and backward change-over mechanism changing over between forward and backward operations of the toroidal transmission mechanism through the planetary gear mechanism by manipulating the the forward coupling element and the backward coupling element;

a supporting wall positioned between the forward and backward change-over mechanism and the toroidal transmission mechanism and disposed within the transmission case, the supporting wall receiving a thrust force exerted towards a toroidal transmission mechanism side by the planetary gear mechanism; and a supporting wall structure including an extension member provided on a side portion of the oil pump to extend along an inner surface of the transmission case towards a toroidal transmission mechanism side, wherein said extension member, together with the oil pump, is secured to said transmission case, wherein said supporting wall is mounted on the extension member at a position opposing to the carrier of the planetary gear mechanism, and wherein one of the forward coupling element and the backward coupling element is supported by the extension member so that said supporting wall structure is adapted to form a package including the oil pump, the forward coupling element, the backward coupling element, and the planetary gear mechanism.

2. A toroidal infinitely variable automatic transmission according to claim 1, wherein said extension member is formed in a drum shape.

3. A toroidal infinitely variable automatic transmission according to claim 1, further comprising:

a cylinder chamber formed at a radially inner position of said extension member so that said cylinder chamber opens at the side portion of the oil pump along a circumferential directions; and a piston for engaging or disengaging the forward coupling element or the backward coupling element is accommodated in the cylinder chamber.

4. A toroidal infinitely variable automatic transmission according to claim 1, wherein said planetary gear mechanism includes a sun gear and said sun gear is axially supported on a side of the carrier opposite to said supporting wall.

5. A toroidal infinitely variable automatic transmission according to claim 2, further comprising:

a cylinder chamber formed at a radially inner position of said extension member so that said cylinder chamber opens at the side portion of the oil pump along a circumferential direction; and a piston for engaging or disengaging the forward coupling element or the backward coupling element is accommodated in the cylinder chamber.

6. A toroidal infinitely variable automatic transmission according to claim 2, wherein said planetary gear mechanism includes a sun gear and said sun gear is axially supported on a side of the carrier opposite to said supporting wall.

7. A toroidal infinitely variable automatic transmission according to claim 3, wherein said planetary gear mechanism includes a sun gear and said sun gear is axially supported on a side of the carrier opposite to said supporting wall.

* * * * *